Sept. 4, 1928.
R. J. GITS
METAL MOLDING
Filed April 29, 1927
1,683,346
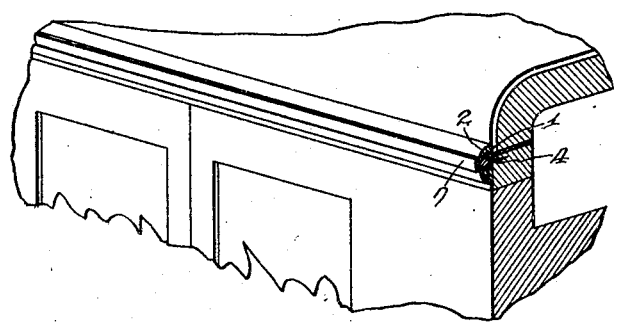
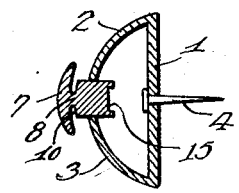 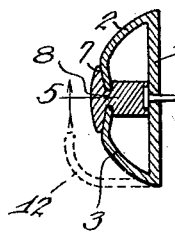 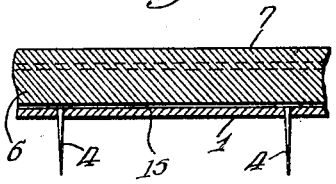
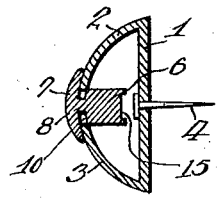
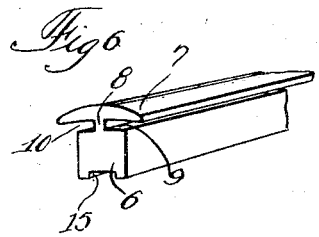

Patented Sept. 4, 1928.

1,683,346

UNITED STATES PATENT OFFICE.

REMI J. GITS, OF RIVERSIDE, ILLINOIS.

METAL MOLDING.

Application filed April 29, 1927. Serial No. 187,564.

This invention relates to improvements in metal molding that is particularly useful in automobile body trimming work.

The main objects of this invention are to provide an improved form of metal molding that can be securely attached and then have the attaching means covered and sealed so as to leave a smooth finished job; to provide a molding of channel shape having a filler that is positively locked in the channel so that it cannot be removed without destruction of the molding; and to provide a metal molding which presents a neat and finished appearance when in use.

An illustrative embodiment of this invention is shown in the accompanying drawings in which:

Figure 1 is a fragmentary view in perspective of a section of the molding in place on an automobile body.

Fig. 2 is a transverse section of the molding after it has been attached and with the combination filler and sealer being placed therein.

Fig. 3 is a view of the same with the filler in position preparatory to being locked in the molding.

Fig. 4 is a view of the same with the molding closed in completed form.

Fig. 5 is a longitudinal section taken on the lines 5—5 of Fig. 4.

Fig. 6 is a view in perspective of a piece of the combination filler and sealer.

Heretofore in the art, various types of molding have been provided of this general character and for the same purpose. One common form of this molding was of channel shape in cross section with short upstanding and inwardly inclined lips on the marginal edges thereof. After it was attached to the body or other surface, a pliable or resilient filler strip was squeezed in between the marginal lips. In some instances, this strip was glued to hold it in place. In this form of molding, the filler strip very often comes loose when subjected to severe climatic conditions and comes out of the molding.

Another form of molding in use at the present time has upstanding and inwardly inclined marginal lips which, when forced down over the channel, are supposed to meet edge to edge, leaving only a hair line to show their point of contact and completely covers ing the tacks by which the molding is attached.

In this form of molding, it requires very careful work to seal the lips edge to edge so as to leave a hair line. Very often, the lips do not meet in the finished work, thus leaving an open gap which is objectionable.

The improved molding of this invention is of soft metal preferably aluminum and is made up in two parts. One is a strip of channel shaped cross section provided at its marginal edges with upstanding inwardly inclined lips that terminate in spaced relation to each other. The other is a combined filler and sealer having a body part which passes between the edges of the inwardly inclined lips and a substantially wider head part joined to the body part by a neck. The head part is of sufficient width to engage against the outer face of the lips and when the combined filler and sealer is forced downwardly toward the base of the channel part by a mallet or hammer the head part forces the edges of the lips downwardly and at the same time draws them inwardly so as to engage the filler at the restricted neck part so that the filler is locked in place and cannot be removed without destruction of the entire molding. As the lips are carried downwardly, they pass center, i. e. a point where they are in alinement, and a toggle action takes place which securely holds the filler snugly against the bottom of the channel.

In the construction shown in the drawings, a channel shaped molding strip having a base part 1 is provided at its opposite marginal edges with upstanding and inwardly inclined lips 2 and 3, the edges of which terminate in spaced relation so that a tack or nail 4 can be driven through the base member for attaching the molding strip.

The combined filler and sealer comprises a body part 6 of a width which will pass between the spaced edges of the lips 2 and 3 and a head part 7 of wider width than the body part 6 connected thereto by a restricted neck part 8, thus forming longitudinally disposed grooves 9 and 10 which have a thickness substantially equal to the thickness of the lips 2 and 3.

The molding strip may also be provided with an eaves trough 12 on one edge thereof for use above the doors of closed car bodies and similar places.

In the use of this molding strip, the base part 1 is fastened to the automobile body or other article by the tacks 4 and then the combined filler and sealer is passed between the edges of the lips 2 and 3 as shown in Fig. 2 until the head part 7 contacts with the outer sides of the lips as shown in Fig. 3. The filler strip is then struck by a mallet or hammer and forced downwardly until the body part 6 contacts with the base 1. This forcing down of the filler strip causes the under sides of the head part 7 to engage the outer surface of the lips 2 and 3 and carry them downwardly and at the same time inwardly as shown at Fig. 4 so as to pass into the longitudinal grooves 9 and 10, thus locking the filler strip in place and leaving a neat finished job. The thickness of the body portion of the filler strip is such that the edges of the lips are carried past center and a toggle action occurs which holds the filler snugly in place.

Although but one specific embodiment of this invention has been herein shown and described, it will be understood that details of the construction shown may be altered or omitted without departing from the spirit of this invention as defined by the following claim.

I claim:

A soft metal molding strip comprising a base, non-resilient lips on said base at the marginal edges, extending upwardly and inwardly and terminating in spaced relation to each other, in combination with a combined filler and sealing strip, said strip having a body portion of substantially the same width as the space between the lips, and a neck portion, said neck portion being of narrower width than said body portion, and a head portion, said head portion being of greater width than said neck portion and said body portion, the body portion of said filler and sealing strip being adapted to freely pass between said lips, and the head portion being adapted to engage the top side of said lips and when forced downwardly towards said base to permanently crimp said lips in engagement with said neck portion for retaining said filler strip and base in assembled relationship.

Signed at Chicago this 27th day of April, 1927.

REMI J. GITS.